(12) United States Patent
Kilcher et al.

(10) Patent No.: US 9,164,368 B2
(45) Date of Patent: Oct. 20, 2015

(54) METHOD AND DEVICE FOR PROJECTING A 3-D VIEWABLE IMAGE

(71) Applicant: Intel Corporation, Santa Clara, CA (US)

(72) Inventors: Lucio Kilcher, Montreux (CH); Nicolas Abele, Demoret (CH)

(73) Assignee: INTEL CORPORATION, Santa Clara, CA (US)

( * ) Notice: Subject to any disclaimer, the term of this patent is extended or adjusted under 35 U.S.C. 154(b) by 162 days.

(21) Appl. No.: 13/782,179

(22) Filed: Mar. 1, 2013

(65) Prior Publication Data

US 2013/0176539 A1    Jul. 11, 2013

Related U.S. Application Data

(63) Continuation of application No. PCT/EP2011/065039, filed on Aug. 31, 2011.

(51) Int. Cl.
| | |
|---|---|
| *G03B 37/04* | (2006.01) |
| *H04N 9/31* | (2006.01) |
| *G03B 21/28* | (2006.01) |
| *H04N 13/04* | (2006.01) |
| *G02B 27/22* | (2006.01) |

(52) U.S. Cl.
CPC ................ *G03B 21/28* (2013.01); *G02B 27/22* (2013.01); *G03B 37/04* (2013.01); *H04N 9/3129* (2013.01); *H04N 9/3147* (2013.01); *H04N 13/0427* (2013.01); *H04N 13/0459* (2013.01); *H04N 13/0497* (2013.01)

(58) Field of Classification Search
CPC ... H04N 13/0459; H04N 9/3147; G03B 37/04
USPC ........ 353/94, 7, 98, 99, 30, 31; 359/464, 465, 359/471, 472; 348/52
See application file for complete search history.

(56) References Cited

U.S. PATENT DOCUMENTS

| 6,538,742 | B1* | 3/2003 | Ohsawa .................... 356/405 |
|---|---|---|---|
| 6,988,803 | B2* | 1/2006 | Maximus ..................... 353/20 |
| 2001/0024231 | A1* | 9/2001 | Nakamura et al. .............. 348/58 |
| 2004/0233275 | A1 | 11/2004 | Tomita |
| 2006/0221303 | A1* | 10/2006 | Sonehara ..................... 353/8 |
| 2007/0127121 | A1* | 6/2007 | Maximus et al. .............. 359/465 |
| 2010/0085425 | A1 | 4/2010 | Tan |
| 2011/0164223 | A1* | 7/2011 | Chiang et al. ................ 353/31 |
| 2012/0086915 | A1* | 4/2012 | Rosen et al. ................. 353/30 |

FOREIGN PATENT DOCUMENTS

| WO | 0169942 A2 | 9/2001 |
|---|---|---|
| WO | 2010093361 A1 | 8/2010 |

* cited by examiner

*Primary Examiner* — William C Dowling
*Assistant Examiner* — Ryan Howard
(74) *Attorney, Agent, or Firm* — Kacvinsky Daisak Bluni PLLC

(57) ABSTRACT

A method for projecting a 3-D viewable image onto a display surface, comprising the steps of, providing two or more projection systems; arranging the two or more projection systems into a first group and second group, wherein the first group and second group each comprise one or more projection systems; arranging the first and second group of projection systems such that each group of project systems can project an image on a display surface and configuring the first and second group of projection systems such that the first and second group of projection systems alternately project onto the display surface.

15 Claims, 6 Drawing Sheets

METHOD AND DEVICE FOR PROJECTING A 3-D VIEWABLE IMAGE

RELATED APPLICATION

This application is a Continuation of PCT/EP2011/065039, filed Aug. 31, 2011, which claims priority from PCT/EP2010/063327, filed Sep. 10, 2010, the subject matter of which are incorporated herein by reference in their entirety.

FIELD OF THE INVENTION

The present invention relates to a method and device for projecting a 3-D viewable image.

BACKGROUND TO THE INVENTION

A MEMS micro-mirror device is a device that contains a Micro-Electrical-Mechanical-System with a reflective surface. The optical MEMS may comprise a cylindrical, elliptical, rectangular or square micro-mirror that is adapted to move and to deflect light over time. The micro-mirror is connected by suspended arms to a fixed part and can tilt and oscillate along one or two axis. For example it can oscillate vertically and horizontally. Different actuation principles can be used, including electrostatic, thermal, electro-magnetic or piezoelectric. MEMS devices are known in which the area of these micro-mirrors are around a few mm2. In this case, the dimensions of the MEMS device, comprising the packaging, is approximately ten mm2. This device is usually made of silicon, and can be encapsulated in a package that can include the driving actuation electronics. Various optical components, such as for example lenses, beam combiner, quarter-wave plates, beam splitter and laser chips, are assembled with the packaged MEMS to build a complete system.

A typical application of the MEMS micro-mirror devices is for projection systems. In a projection system, a 2-D image or a video can be displayed on any type of surface. In a colour system, each pixel is generated by combining modulated red, green and blue laser light sources, by means of, for example, a beam combiner. A MEMS micro-mirror device directs the light of the laser light source to a projection surface and reproduces the image, or the video, pixel-by-pixel. By means of its oscillations, the micro-mirror within the device will continuously scan from left to right and from top to bottom, or according to a different trajectory including e.g., Lissajou trajectories, so that each pixel of the 2-D image is displayed on the screen.

Typically, the micro-mirror of a MEMS micro-mirror device is able to oscillate along one axis. Therefore, in order to display a 2-D image on a screen a projection system will require two MEMS micro-mirror devices; a first MEMS micro-mirror device is required to deflect light along the horizontal and a second MEMS micro-mirror device is required to deflect light along the vertical. During operation, the micro-mirror of the first MEMS micro-mirror device receives light from the beam combiner and deflects the light to the micro-mirror of the second MEMS micro-mirror device. The micro-mirror of the second MEMS micro-mirror device will in turn deflect the light to the display surface where it will appear as a pixel. The micro-mirror of the first MEMS micro-mirror device will oscillate to scan the light along the horizontal thereby displaying the first row of pixels on the display surface. The micro-mirror of the second MEMS micro-mirror device will oscillate about its oscillatory axis so that light received from the micro-mirror of the first MEMS micro-mirror device is scanned along the vertical. The combined effect of the oscillating micro-mirrors is that the light from the beam combiner is scanned in a zig-zag or raster pattern along the display surface. The process is continuous so that a complete image is visible to the viewer on the display surface. The first and the second MEMS micro-mirror devices are precisely positioned such that the oscillatory axes of the respective micro-mirrors are orthogonal; this ensure that all the light received by the micro-mirror of the first MEMS micro-mirror device will be deflected to the micro-mirror of the second MEMS micro-mirror device as the micro mirrors oscillate.

Other MEMS micro-mirror devices comprise a micro-mirror which can oscillate along two orthogonal axes. Such a micro-mirror can scan the light beam in two dimensions. Therefore, to display a 2-D image on a display surface a single mirror will oscillate about two axes to scan the light in a zig-zag, lissajou or raster pattern over the display surface. Various methods of oscillating the micro-mirrors are employed. For example, an electrostatic means; thermal means; electro-magnetic means, or piezoelectric means.

Projection systems in general are used to project images or videos onto a display surface. The projection systems currently used to project 3-D images on a display surface are complex and expensive. There is a need in the art for a simplified means and method which will enable the projection of a 3-D image.

It is an aim of the present invention to obviate or mitigate one or more of the aforementioned disadvantages.

SUMMARY OF THE INVENTION

According to a first aspect of the present invention there is provided a method of projecting a 3-D image comprising the steps of:
 a. providing two or more projection systems;
 b. arranging the two or more projection systems into a first group and second group, wherein the first group and second group each comprise one or more projection systems;
 c. arranging the first and second group of projection systems such that each group of project systems can project an image on a display surface, wherein the first group of projection systems is arranged such that the first group of projection systems can project an image to a first position on the display surface and the second group of projection systems is arranged such that the second group of projection systems can project an image to a second position on the display surface, wherein the first and second positions off-set from one another;
 d. configuring the first and second group of projection systems such that the first and second group of projection systems alternately project onto the display surface.

It will be understood that a group of projection systems may comprises one or more projection systems.

A projection system may scan light signals which define pixels of an image bidirectionally, unidirectionally, progressively, or such that projected pixels are interlaced.

Preferably, the first and second positions are off-set from one another by an amount required to form 3-D image on the display surface. Preferably, the off-set is substantially equal to the average distance between a human's left eye and a human's right eye. Preferably, the off-set is between 0 cm-11 cm. More preferably, the off-set is between 0.1 cm-6 cm.

The method may further comprise dynamically adjusting the position to which the first group of projection systems project an image and the position to which the second group of projection systems project an image, so as to dynamically adjust the off-set between the first and second positions.

The method may further comprise the step of detecting the position of a viewer relative to a display surface. The method may further comprise the step of detecting the distance of a viewer from a display surface.

The method may comprise the step of determining an optimum position to which the first group of projection systems should project an image and an optimum position to which the second group of projection systems should project an image, based on the detected position of a viewer relative to a display surface. The method may comprise the step of determining an optimum position to which the first group of projection systems should project an image and an optimum position to which the second group of projection systems should project an image, based on the distance of a viewer relative to a display surface. The optimum position will be a position at which an image should be projected so that a 3D image will be visible to a viewer from their viewing position.

The method may further comprise the step of refreshing each of the images projected by the first group of projection systems and the second group of projection systems. Each of the images may be refreshed independently. For example, the image projected by the first group of projection systems may be refreshed at a rate of 60 Hz, and the image projected by the second group of projection systems may be independently refreshed at a rate of 60 Hz; thus the overall resulting 3-D image will be refreshed at a rate of 60 Hz.

The method may further comprise the step of arranging one or more additional projector system or groups of projection systems (for example a third and fourth group of projection systems), wherein the additional projection system or groups of projections systems is/are arranged to project a 3-D image on a display surface using any one of the above-mentioned methods. The 3-D image projected on the display surface by the additional projector system or groups of projections systems may cooperate with the 3-D image projected on the display surface by the first and second group of projection systems to provide a single 3-D image which has an improved brightness, or to provide a larger 3-D image (e.g., the first and second group of projection systems projecting a first 3-D image and the additional projection system or groups of projections systems projecting a second 3-D image; wherein both the first and second 3-D images cooperate to define a single larger 3-D image on the display screen, or overlay to provide a single brighter 3-D image). The image projected by an additional projection system may be refreshed at a rate of 60 Hz. The image projected by additional groups of projection systems may be refreshed at a rate of 60 Hz.

The method may further comprise the step of selecting a 3-D image size and adjusting both the first and second group of projection systems and the one or more additional projection system or groups of projection systems such that the 3-D image projected by the first and second group of projection systems and the 3-D image projected by the one or more additional projector system or groups of projection systems, cooperate on the display surface to provide a single 3-D image which has the selected 3-D image size.

The method may further comprise the step of adapting the brightness of the entire, or part, of the 3-D image projected by the first and second group of projection systems, and the brightness of the entire, or part, of the 3-D image projected by the one or more additional projector system or groups of projection systems, such that the single 3-D image which has the selected 3-D image size, is of uniform brightness.

According to a further aspect of the present invention there is provided a projection system which is configured to project an image which can cooperate with an another image projected by another projection system, to provide a 3-D viewable image on a display surface, the projection system comprising, a detector operable to detect a first position, wherein the first position is the position on a display surface at which a first image is projected by a second projection system, a controller operable to adjust the projection system, such that it projects a second image to a second position on the display surface, wherein the first position and second position are off-set from one another such that the alternative projection of the first image by the second projection system and the second image by the first projection system, provides a 3-D viewable image on the display surface.

The detector may be operable to detect a first position and second position on the display surface, wherein the first position is a position on a display surface at which a first image is projected by a first group of projection systems and the second position is a position on the display surface at which a second image is projected by a second group of projection systems. The controller may be operable to adjust the projection system, such that it projects a second image to the second position on the display surface, and wherein the first position and second position are off-set from one another such that the alternative projection of the first image by the first group of projection systems and the second image by the second group of projection systems, provides a 3-D viewable image on the display surface.

The projection system may further comprise a means to dynamically adjust off-set between the first and second positions. The projection system may further comprise a means to dynamically adjust the position to which the projection system projects an image and the position to which the second projection system projects an image, so as to dynamically adjust the off-set between the first and second positions. The projection system may further comprise a means to dynamically adjust the position to which the first group of projection systems project an image and the position to which the second group of projection systems project an image, so as to dynamically adjust the off-set between the first and second positions.

The projection system may further comprise a means for detecting the position of a viewer relative to a display surface. The projection system may further comprise a means for detecting distance of a viewer from a display surface. The projection system may further comprise a means for detecting angle at which a viewer is viewing a display surface. The projection system may further comprise a means for detecting an angle the viewer is at relative to the display surface.

The projection system may comprise a means for determining an optimum position to which the projection system should project an image and an optimum position to which the second projection systems should project an image, based on the detected position and/or angle of a viewer relative to a display surface. The projection system may comprise a means for determining an optimum position to which the projection system should project an image and an optimum position to which the second projection systems should project an image, based on the distance and/or angle of a viewer relative to a display surface. The projection system may comprise a means for determining an optimum position to which the first group of projection systems should project an image and an optimum position to which the second group of projection systems should project an image, based on the detected position and/or angle of a viewer relative to a display surface. The projection system may comprise means for determining an optimum position to which the first group of projection systems should project an image and an optimum position to which the second group of projection systems should project an image, based on the distance and/or angle of a viewer relative to a display surface. The means for determining an optimum position may be arranged in operable communication with the means to dynamically adjust off-set between the first and second projected image positions.

The projection system may further comprise a means for refreshing an image projected by the projection systems. The projection system may further comprise a means for refreshing each of the images projected by the first group of projection systems and the second group of projection systems. Preferably the projection system further comprises a means for refreshing, independently, each of the images projected by the first group of projection systems and the second group of projection systems.

The projection system may further comprise a controller which can adjust the projection system to compensate for irregularities on the display surface. The controller may operate automatically. The irregularities may comprise contours on the surface, surface smoothness, surface roughness, the colour of the display surface, the angle of the display surface, surface non-homogeneity, or any other physical feature of the display surface.

According to a further aspect of the present invention there is provided a method for projecting an image onto a display surface, comprising the steps of:
a. providing two or more projection systems;
b. arranging the two or more projection systems such that they each project an image on a display surface;
c. off-setting an oscillating reflective surface within at least one of the two or more projection systems such that the image projected by each of the two or more projection systems are in co-operation on the display surface.

Each projection system may be configured to project the same image.

Each projection system may be configured to project part of a complete image.

When each projection system is configured to project the same image, the two or more projection systems are each configured such that the image projected by each of the two or more projection systems co-operate by overlapping. When the images projected by each of the projection system overlap the overall brightness of the image visible on the display surface is increased. The overlapping of the images on the display surface allows the light projected by each projection system to be combined on the display surface, thereby providing a brighter image. For example, a first projection system may be configured to project an image onto a display surface; a second projection system may be configured to project the same image onto the same position on the display surface. The light projected by the second projection system is superposed on the image projected by the first projection system so that a brighter image is visible on the display surface.

When each projection system is configured to project part of a complete image, the two or more projection systems are each configured such that the image projected by each of the two or more projection systems co-operate by aligning. Aligning the images enables the image projected by the two or more plurality of projection systems to be combined to form a single larger image on the display surface. For example, a first projection system may project an image which forms a first half of a complete image and a second projection system may project an image which form a second half of a complete image, the first and second projection systems may each be configured such that the images they project co-operate by aligning on the display surface. When the first half of the complete image and the second half of the complete image are in alignment, a complete image will be visible on the display surface. The complete image will be larger than an image of the same quality which could be projected by any one of the projections systems alone. Advantageously, unlike 'video-walls' there is no border between the images projected by each projection system, so a complete image which is without gaps, borders or spaces, will be visible on the display surface.

The method may comprise the steps of projecting a first image with a first exposure using a first projection system, and projecting a second image with a second exposure using a second projection system, wherein the first exposure is different to the second exposure. Preferably the first exposure is an over/under exposure and the second exposure is a normal exposure, such that the first image is over/under exposed and the second image is normally exposed. More preferably the first image with a first exposure and the second image with a second exposure cooperate to on the display surface to provide an image which has improved brightness or of improved readability. The method may comprise the steps of projecting an over exposed image using a first projection system, projecting a correctly exposed image using a second projection system, and projecting an under exposed image using a third projection system. The over exposed image, correctly exposed image, an under exposed image may cooperate to on the display surface to provide an image which has improved brightness or of improved readability. Preferably, the pictographic data of each image is the same. It will be understood that the image could be a frame of a video.

Any one of the aforementioned methods may further comprise the step of dimming light projected by a projection system. The methods may further comprise the step of adjusting parameters of light projected by a projection system. The parameters may comprise one or more of contrast, tone, colour gamut, colour balance, brightness, saturation and/or adaptive image ISO. This may be carried out to increase the perceived brightness of a projected image. Any one of the aforementioned methods may further step of providing a filter to adjust characteristics of a projected image. For example, the filter could be arranged to adjust colour, attenuation, blur, sharpener, artistic, brush strokes, sketch, stretch, render, stylize, distortion, pixelization, shadow, digitization, edge sharpen, equalizer, night vision, panorama, red eye eraser, texture and/or noise in a projected image. All of these parameters can either be applied in a fixed range of dynamic range.

The two or more projection systems may each project an image, wherein the image projected by each projection system comprises a portion of the resolution of a complete image to be displayed on the display surface. The two or more projection systems may be configured such that the image projected by each of the projection system co-operate by meshing. For example, each of the projection systems may project an image, wherein the image projected by each projection system comprises a portion of the pixels required to display a complete image, to be displayed on the display surface. The images projected by each of the projection systems co-operate on the display screen to display an image of improved resolution. Advantageously, with 'N' projectors with a defined resolution, an image of 'N' times higher resolution can be displayed on the display surface. For example, a first projection system may project a first image on the display surface, the first image comprising half of the pixels of the complete image to be displayed on the display screen. A second projection system may project a second image on the display surface, the second image comprising the other half of the pixels of the complete image to be displayed on the display surface. Both projection systems are configured such that the image projected by each projection system co-operate by meshing on the display surface, to display a complete image on the display surface. The meshing of the first and second images ensures that successive pixels of the complete image are projected by the first and second projection systems. It will be understood that the successive pixels of the complete image are projected by the first and second projection systems either, alternately, consecutively, interlaced or progressively. The successive pixels of the complete image may be projected by the first and second projection systems such that the pixels projected by each of the first and second projection systems are meshed. The complete image therefore has twice the resolution of an image which could be projected by either one of the first or second projection systems alone.

The method may further comprise detecting characteristics of the images projected by some or all of the two or more projection systems.

The method may further comprise the step of detecting the position on the display surface of the image projected by a projection system. Preferably, the method further comprises the step of detecting the position on the display surface of the image projected by each of the two or more projection systems. The two or more projection systems may be configured such that the images projected by each of the projection system are in co-operation on the display surface, based on the detected position of the images projected.

Any one of the aforementioned methods may comprise the step of detecting gestures made by a user. The methods may comprise the step of detecting an object; for example the method may comprise the step of detecting a pointer which is positioned on an image. The images projected may comprise tactile functionality. The methods may further comprise the step of detecting tactile interaction with a projected image.

The method may further comprise detecting the size of the images projected by some or all of the two or more projection systems.

The method may further comprise detecting the brightness of the images projected by some or all of the two or more projection systems.

The step of detecting the characteristics of an image may comprise carrying out at least one of: self mixing; image projection analysis using a camera to analyze an image; time of flight measurement by measuring the time of flight of a signal which defines a pixel, or signals which define a group of pixels, in a projected image (the time of flight of the signals can be measured simultaneously with the projected pixel or successively); measuring time of flight of a signal which defines a pixel, or signals which define a group of pixels, in a projected image using a single photodiode; carrying out triangulation using two or more cameras; projecting a patterned test image and measuring deformation of the patterned image. The method may further comprise the step of measuring distance using an acoustic sensor. For example the distance of a projection system, or viewer, from the display surface may be measured. Distances may also be measured by detecting the laser diode or LED light (visible, UV or IR) reflected by the display surface with a photodiode, or using a proximity sensor.

Any one of the aforementioned methods may comprise the step of detecting the characteristics of display surface.

Any one of the aforementioned methods may comprise the step of adjusting one or more of the projectors to account for irregularities on the display surface. For example, the method may comprise the step of detecting shape, colour and or texture of the display surface. The one or more of the projectors may be adjusted so that a projected image is viewable across the whole display surface.

The method may further comprise the step of off-setting a reflective surface of a projection system. The method may further comprise the step of off-setting one or more reflective surfaces of the two or more projection systems. Preferably, the method comprises the step of applying a DC off-set to a reflective surface to off-set the reflective surface. Off-setting the reflective surface will adjust direction in which the projection system projects, accordingly off-setting the reflective surface can be used to move the position of the projected image such that the projected image co-operates with an image projected by one or more other projection systems.

Any one of the afore-mentioned methods may comprise the step of off-setting direction to which a projector projects to avoid an obstacle positioned in a projection path of the projector. Any one of the afore-mentioned methods may comprise the step of off-setting direction to which a projector projects to avoid an area of the display surface which is not suitable for displaying a projected image. Any one of the afore-mentioned methods may comprise the step of off-setting direction to which a projector projects to avoid an obstacle in obstructing the display surface.

The direction to which a projector projects can be off-set using as least one of; applying a DC off-set signal to an actuation signal which is actuates oscillation of a mirror in a projection device; off-setting the position of a holder which holds a mirror in the projection device; off-setting a reflective surface which cooperates with a reflective device in a projection device. The reflective device may be a MEMS mirror, DLP or LCOS device or any other suitable reflective device.

Any one of the afore-mentioned methods may comprise the step of proposing to a user different positions on the display surface onto which to project. For example a projection system may project randomly to a plurality of different positions. The projection system may request the used to choose one of the plurality of positions for projection.

The method may further comprise the step of modifying the speed at which a reflective surface of a projection system oscillates. The method may further comprise the step of modifying the speed at which one or more reflective surfaces of the two or more projection systems oscillate. The method may comprise modifying an actuation signal which is used to oscillate a reflective surface in a projection system. For example, the amplitude of actuation signals used to oscillate reflective surfaces in each of the two or more projection systems may be increased or decreased. Increasing the amplitude of the actuation signal will increase the amplitude of oscillation of the reflective surface; accordingly the light projected from the projection systems will be projected over a wider span of the display surface, thereby increasing the size of the images projected by the projection system. Optionally, the modulation of the laser source may also be modified to decrease the speed at which the light pulses are generated by the laser source when the amplitude of oscillation of the reflective surface is increased; this will ensure that gaps do not appear between successive pixels on the display surface. Decreasing the amplitude of the actuation signal may decrease the amplitude of oscillations of the reflective surface; accordingly the light projected from the projection system will be projected over a shorter span of the display surface, thereby decreasing the size of the image projected. Optionally, the modulation of the laser source may also be modified to increase the speed at which the light pulses are generated by the laser source when the amplitude of oscillation of the reflective surface is decreased; this will ensure that the pixels belonging to a particular row do appear on another row, thereby not distorting the image.

The method may further comprise the step of, modifying the modulation of a light source in a projection system. Modifying the modulation of a light source in a projection system can alter the size of the image projected on the display surface. For example, modifying the modulation of a light source in a projection system can crop the image projected on the display surface, thereby decreasing the size of the image visible on the display surface. For example, the light source in a projection system may be a laser source; light pulses may be generated by the laser source, each light pulse corresponding to a pixel of the image to be projected onto a display surface. The light from the laser source may be scanned across the display surface by a micro-mirror within the projection system. For example, the micro-mirror may oscillate about a two orthogonal oscillation axes to scan the laser light in a zig-zag, lissajou or raster pattern along the display surface, so that the image is projected, pixel-by-pixel, onto the display surface. If the modulation of the laser source is now modified to increase of the speed at which the light pulses are generated then, assuming the speed of oscillation of the micro-mirror remains the same, the space between consecutive pixels on the display surface will be reduced. Accordingly, a smaller image will be visible on the display surface. Furthermore, increasing the speed of the light pulses generated by the laser source will ensure that each row of pixels of the image will be projected prior to the micro-mirror completing full oscillations. Accordingly, the image is cropped and a smaller image will be visible on the display surface.

The reflective surface may be a mirror. For example, the reflective surface may be a MEMS micro mirror. The reflective surface may be a DLP, LCOS, LCD, TFT, and or OLED.

The method may further comprise the step of adjusting the brightness of the light projected by one or more of the projection systems. The brightness of the light projected by one or more of the projection systems may be adjusted so that the brightness of the light projected by each projection system is uniform. The brightness of the light projected by one or more of the projection systems may be adjusted so that the brightness of the light projected by each projection system is non-uniform to account for irregularities on the display surface.

The image projected by each of the projection systems may be a test image which is used to determine how the two or more projection systems should be configured such that the image projected by each of the projection system are in co-operation on the display surface.

According to a further aspect of the present invention there is provided a projection system, which is configured to project an image which is co-operable with images projected by one or more other projection systems, wherein the projection system comprises:
 a. a detector operable to detect characteristics of images projected by the projection system and the one or more other projection systems and
 b. a controller operable to adjust the projection system and/or the one or more other projection systems, based on the characteristics of the images detected by the detector, such that the images projected by each projection system co-operate on a display surface.

The controller may be operable to adjust a reflective surface within projection system and/or to adjust reflective surfaces within the one or more other projection systems, based on the characteristics of the images detected by the detector, such that the images projected by each projection system co-operate on the display surface.

According to a further aspect of the present invention there is provided a projector arrangement comprising a plurality of projection systems according to the previous paragraph.

The detector may be configured to detect at least one of the characteristics of the images selected from the group of comprising; the position of the image on the display surface; the size of the image on the display surface; the brightness of the image.

The detector may comprise one or more CCD cameras and/or one or more CMOS cameras and/or one or more photodiodes or photodiode array.

The controller may be operable to adjust a projection system, based on the characteristics of the images detected by the detector, to change the size, position, and/or brightness of the image projected by the projection system.

The controller may be operable to adjust the projection systems such that the images projected by the projection systems co-operate by overlapping. The controller may be operable to adjust the projection systems such that the images projected by each projection systems co-operate by aligning. Preferably, the controller is operable to off-set a reflective surface of a projection system. For example, a first projection system may project a first image onto a display surface and second projection system may project the same image onto a different position on display surface. Each of the first and second projection systems project images in the same manner: light pulses corresponding to an image pixels, are generated in a light source of the each projection system; a reflective surface in each projection system, in the form of a MEMS micro mirror, is oscillated about two orthogonal oscillation axis by means of an actuation signal which is applied to piezoelectric actuators which co-operate with the MEMS micro mirrors, to scan the light pulses in a zig-zag, Lissajou, or raster pattern across the display surface to display the image on the display surface pixel-by-pixel. The first projection system is a projection system according to the present invention. The detector of the first projection system detects the position on the display surface of the images projected by the first and second projection systems. Subsequently, the controller adjusts the actuation signals which are applied to piezoelectric actuators in the first projection system, by applying a DC off-set to the actuation signal, thereby causing the first projection system to project its image to a defined location on the display surface. The controller of the first projection system communicates wirelessly (or with wire) with the second projection system and sends a command to the second projection system to apply a DC off-set to its actuation signal, or to the DC signal, or to apply a DC off-set to a physical device holding the mirror, causing the second projection system to also project its image to the defined location on the display surface. Accordingly, the image projected by the first projection system and the image projected by the second projection system overlap on the display surface. Overlapping the images projected by the projections systems will provide for image or increased brightness visible on the display screen. Alternatively, the controller can adjust each projection system such that the images projected by each projection system are in alignment on the display surface. Alternatively, it is also possible for each of the projections systems to comprise its own detector and a controller. The detector and controller of each projections system can co-operate with the detectors and controllers of the other mobile phones to achieve the desired co-operation of the images on the display surface. Alternatively, if each of the projections systems comprises a detector and controller, then the detector and controller of one of the projections systems may be designated as the "master" and the detectors and controllers of the other mobile phone designated as the "slaves". The master detector and controller may effect adjustment of the projection systems in the other mobile phones.

The actuation signal may be an AC voltage or DC voltage or any other suitable actuation signal.

It will also be understood that any other actuators may be used other than piezoelectric actuators; for example the actuators may be thermal, electrostatic, magnetic actuators.

The controller may be operable to adjust one or more projection systems such that the size of the image projected by each projection system is altered. Preferably, the controller is operable to modifying the amplitude at which a reflective surface in each of the one or more projection systems, oscillate. For example, the detector can detect the size of the image projected by the two projection systems and subsequently the controller can adjust each projection system such that they each project the same size of image, by for example, modifying the amplitude at which a reflective surface in each of the two projection systems, oscillate.

The controller may be operable to modifying the modulation of a light source in one or more projection systems.

The controller may be operable to adjust the brightness of the light projected by a projection system. The controller may be operable to adjust the brightness of the light projected by each of the projection systems. Preferably, the controller is operable to adjust the brightness of the light projected by one or more projection systems such that brightness of the light is projected by each the projection system is uniform.

The controller may be operable to calculate an optimum position on the display surface for projection of the image. Projecting the image at the optimum position will minimise required overall adjustment of the projection systems in order to achieve the desired co-operation of the images on the display surface.

According to a further aspect of the present invention there is provided a projection system, which is configured to project an image which is co-operable with images projected by one or more other projection systems, wherein the projection system comprises:
  a. a receiver, configured to receive commands from a controller of another projection system.

Preferably, the receiver is configured to receive commands from a controller of a projection system according to any of the above-mentioned projection systems.

The projection system may comprise a controller configured to execute the commands received.

According to a further aspect of the present invention there is provided a mobile device comprising any of the above-mentioned projection systems.

The mobile device may be at least one selected from the group comprising, a mobile phone, digital camera, laptop computer, tablet, smart-phone or any mobile device such as automobile, motorbike, scooter or a plane.

The projection system may comprise a means to send a synchronization signal to 3-D viewing glasses. Any one of the above methods may comprise the step of sending a synchronization signal to 3-D viewing glasses.

BRIEF DESCRIPTION OF THE DRAWINGS

An embodiment of the invention will now be described by way of example only, with reference to the accompanying drawings in which, FIG. 1 provides a perspective view of four mobile phones, each of which comprises a projection system according to an aspect of the present invention, wherein the projection system of each mobile phone is arranged to project an image onto a display surface.

DETAILED DESCRIPTION OF THE DRAWINGS

Figure 1:
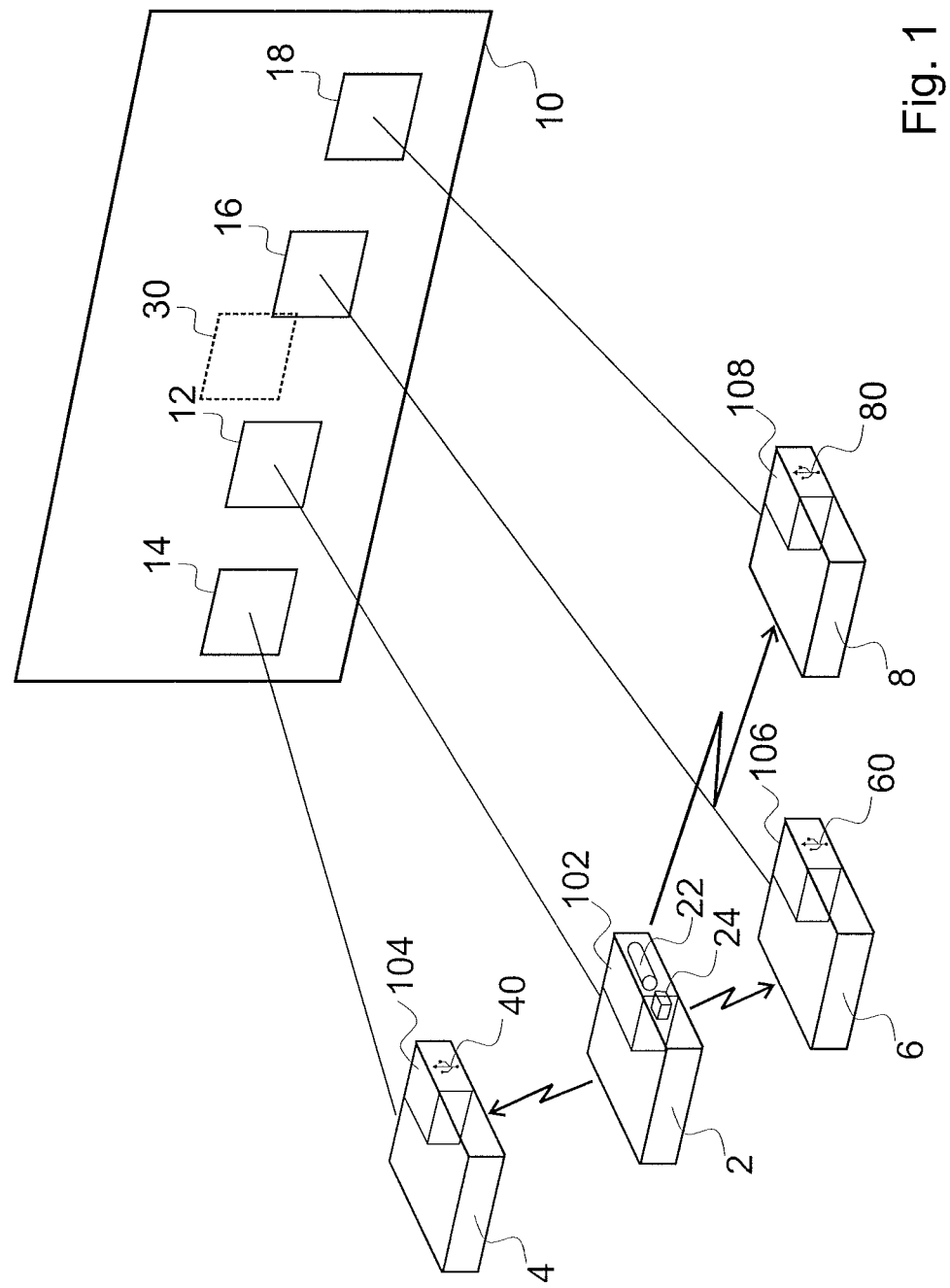
FIG. 1a provides a perspective view of a projection system which each of the mobile phones shown in FIG. 1 comprise.

FIG. 1 provides a perspective view of four mobile phones 2,4,6,8. Each of the phones 2,4,6,8 comprises a projection system 102,104,106, 108 which projects an image 12,14,16, 18 onto a display surface 10. The four mobile phones 2,4,6,8 each have a different orientation, accordingly, the positions of their respective projected images 12,14,16,18 on the display surface 10 is different.

FIG. 1a provides a perspective view of the projection system 102,104,106, 108 which each mobile phone 2,4,6,8 comprises. As shown in the figure the projection system 102,104, 106, 108 comprises a beam combiner 800, a beam splitter 403 and two packages 405,407 each of which houses a micro mirror (not shown) which can deflect light from the beam splitter to the display screen (not shown).

Figure 2:
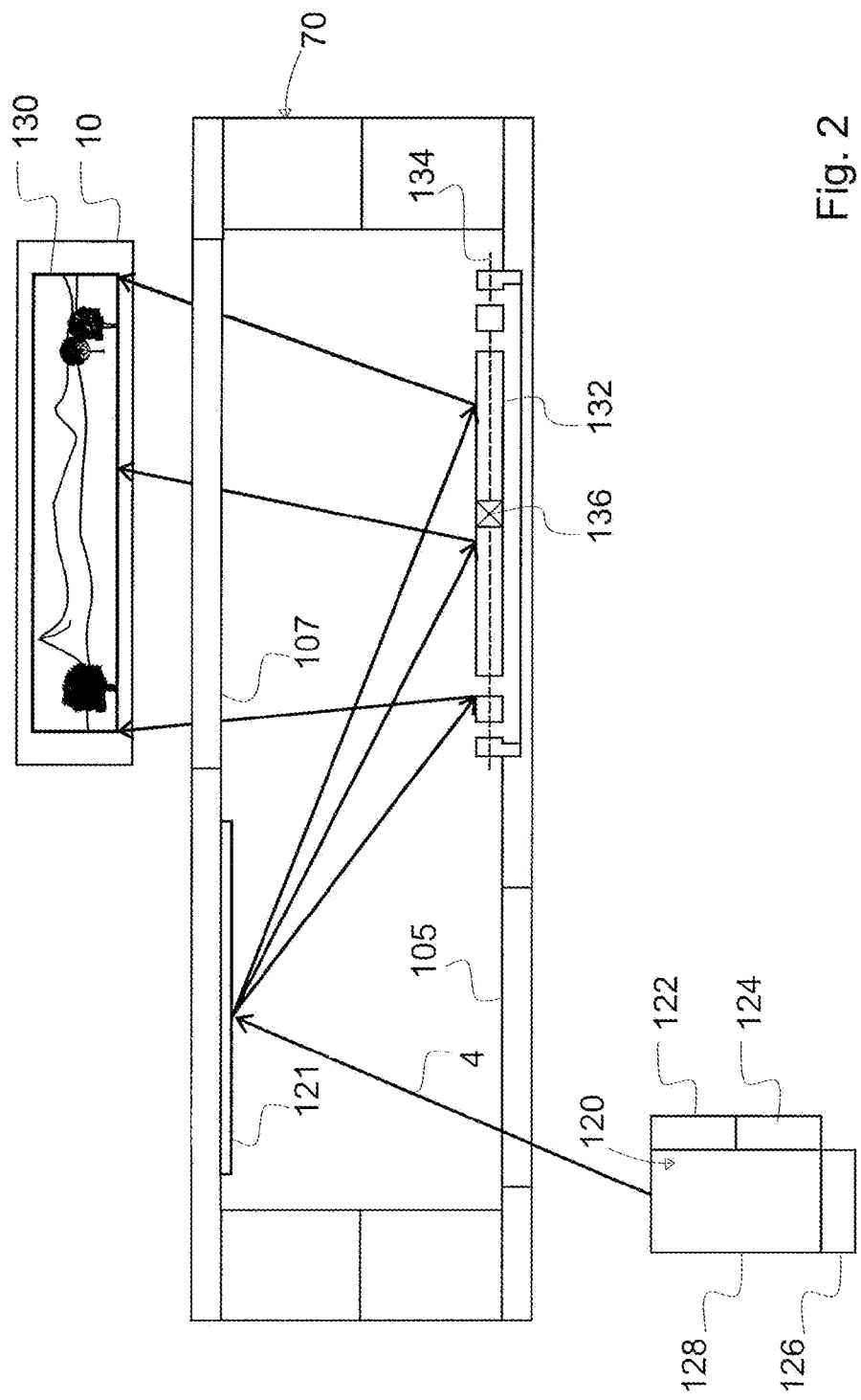
FIG. 2 illustrates the features which are common to the projection systems of each of the mobile phones shown in FIG. 1.

FIG. 2 illustrates one possible configuration for the features which are common to each projection system 102,104, 106, 108 of each mobile phone 2,4,6,8. Each projection system comprises a light source 120 which comprises a red 122, green 124 and blue 126 lasers, each of which provides light which is combined in a beam combiner 128 to generate light pulses 4. Each light pulse 4 corresponds to a pixel of an image 130 (or video) to be projected onto the display surface 10. Each projection system 102,104,106, 108 comprises a housing 70 which comprises a fixed reflective element 121 and a MEMS micro mirror 132 supported therein. The MEMS micro mirror 132 is configured to oscillate about two orthogonal oscillation axes 134,136.

During operation light pulses 4 pass from the beam combiner 128 to the fixed reflective element 121 via a transparent window in the housing 70. The light pulses 4 are deflected by the fixed reflective element 121 to the MEMS micro-mirror 132. The MEMS micro-mirror 132 deflects the light pulses 4 to the display surface 10, via a second transparent window 107 in the housing 70, allowing the reproduction of the image 130 (or video) on the display surface 10. As the MEMS micro-mirror 132 deflects the light pulses 4 to the display surface 10 it oscillates to about its two orthogonal oscillation axes 134,136. By oscillating, the micro-mirror 132 within the projection systems 102,104,106,108 will continuously scan the light pulses in a zig-zag pattern over the display surface 10 so that the 2-D image is displayed on the display surface 10, pixel-by-pixel.

The MEMS micro-mirror 132 is actuated to oscillate about its two orthogonal oscillation axes 134,136 by an actuation signal which is applied to piezoelectric actuators (not shown) which co-operate with the MEMS micro mirror 132 to oscillate it about its two orthogonal oscillation axes 134,136.

Figure 3:
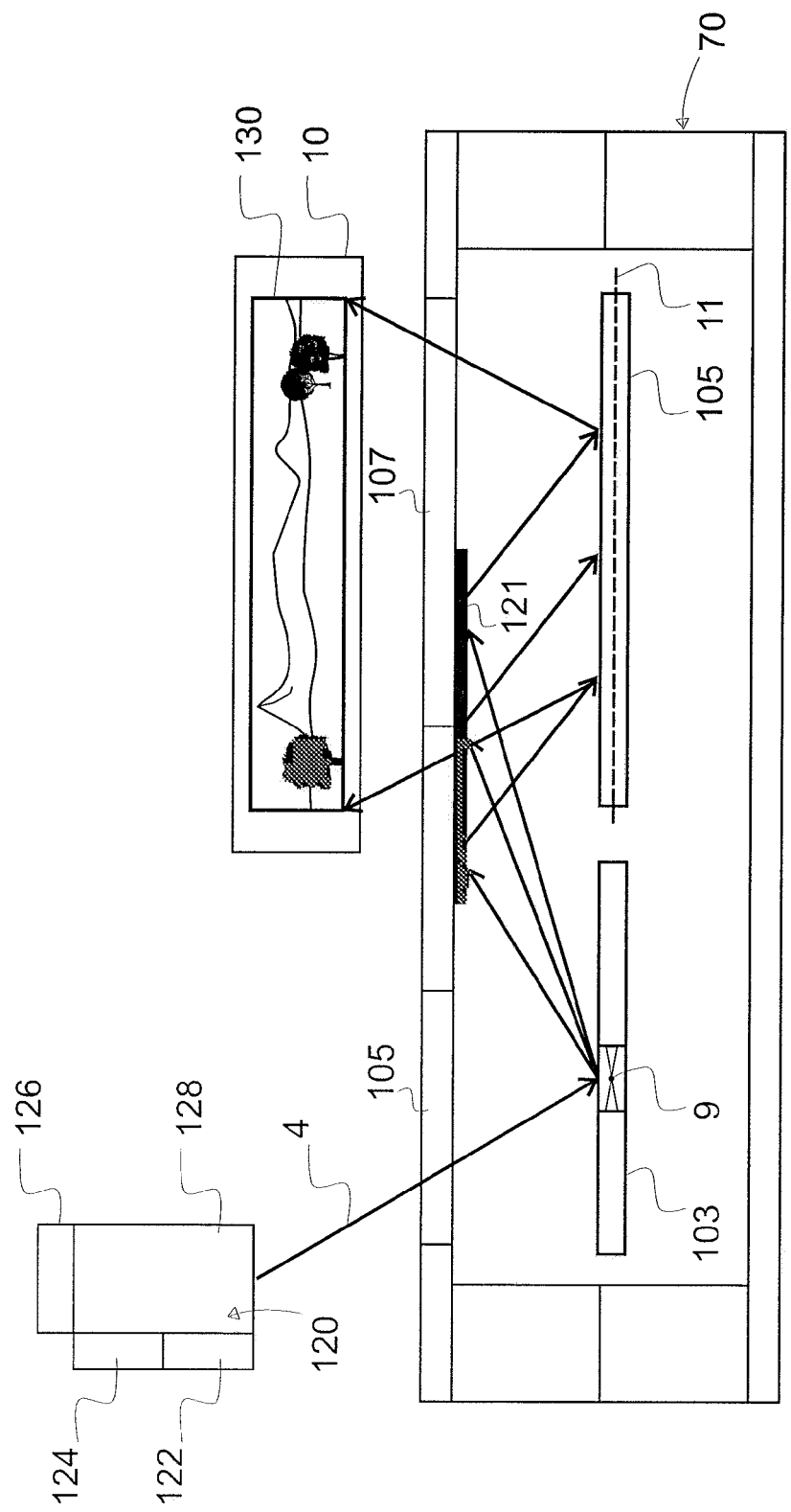
FIG. 3 illustrates a alternative configuration for the projection systems of the mobile phones shown in FIG. 1.

An alternative to the configuration illustrated in FIG. 2, each projection system 102,104,106,108 may be configuration as illustrated in FIG. 3. In the configuration shown in FIG. 3, instead of having one micro-mirror which oscillates about two orthogonal axis, two MEMS micro mirrors 103, 105 are provided, each MEMS micro mirror 103,105 is arranged to oscillate about a single oscillation axis 9,11 and wherein the axes of oscillation 9,11 of the MEMS micro mirrors 103,105 are perpendicular. The projection system 102,104,106,108 operates in a similar fashion to the projection system illustrated in FIG. 2, except that the first MEMS micro-mirror 103 oscillates about oscillation axis 9 to cause the light pulses 4 to be deflected along the horizontal and a second MEMS micro-mirror 105 oscillates about oscillation axis 11 to cause the light pulses 4 to be deflected along the vertical. The combined effect of the two oscillating MEMS micro-mirrors 103,105 is to scan the light pulses 4 in a zig-zag pattern over the display surface 10 so that the 2-D image 130 is displayed on the display surface 10, pixel-by-pixel. As was the case for the configuration shown in FIG. 2, each MEMS micro-mirror 103,105 is actuated by an actuation signal which is applied to piezoelectric actuators (not shown) which co-operate with each of the MEMS micro mirrors 103,105 to oscillate them about their respective oscillation axis 9,11.

In the present example, the projection systems 102,104, 106, 108 of each of the mobile phones 2,4,6,8, shown in FIG. 1 each comprise a MEMS micro-mirror which is configured to oscillate about two orthogonal oscillation axes (i.e. each projection system has the configuration shown in FIG. 2). Accordingly, each of the projection systems 102,104,106,108 project their images 12,14,16,18 in the same manner: light pulses 4 corresponding to image pixels, are generated in a light source 120 of the projection system; a MEMS micro mirror 132, in each projection system 102,104,106,108, is oscillated about its two orthogonal oscillation axes 134,136 by means of an actuation signal (usually an AC voltage) applied to piezoelectric actuators (not shown) which co-operate with the MEMS micro mirror 132, to scan the light pulses 4 in a zig-zag pattern across the display surface 10 to display the image 130 on the display surface.

Referring once again to FIG. 1; the projection system 102, contained in mobile phone 2, further comprises a detector 22 and a controller 24. The detector 22 is operable to detect characteristics of the images 12,14,16,18 projected by the projection systems 102,104,106,108 of each mobile phone 2, 4, 6, 8. In the present embodiment the detector 22 is operable to detect, the position of each image 12,14,16,18 on the display surface 10, the brightness of each image 12,14,16,18 and the dimensions of each image 12,14,16,18. It will be understood that the detector 22 could be configured to detect other characteristics of each image 12, 14, 16, 18 in addition to image's position, brightness and dimensions. In the present embodiment the detector 22 is a CCD or CMOS camera or a photodiode, however it will be understood that the detector 22 may take any other suitable form.

The controller 24 is operable to adjust the projection system 102, and the projection systems 104,106,108 in the other mobile phones 4,6,8, based on the characteristics of the images 12,14,16,18 detected by the detector 22. The controller 24 is in wireless communication (as illustrated by zig-zag arrows) with the projections systems 104,106,108 of the other mobile phones 4,6,8, via a wireless communication means (not shown). In order to adjust the projection systems 104, 106,108 of the other mobile phones 4,6,8, the controller 24 sends adjustment commands to the projection systems 104, 106,108 of the other mobile phones 4,6,8, via the wireless communication means. The projection systems 104, 106, 108 in each of the other mobile phones 4,6,8, comprise a receiver 40,60,80 which receives adjustment commands sent by the controller 24. It is also possible for projection system 102, 104,106,108 of each of the mobile phones 2,4,6,8 to comprise its own detector 22 and a controller 24. The detector 22 and controller 24 of each mobile phone can co-operate with the detectors 22 and controllers 24 of the other mobile phones to achieve the desired co-operation of the images on the display surface. Alternatively, if each of the projection system 102, 104,106,108 of each of the mobile phones 2,4,6,8 comprises a detector 22 and controller 24, then the detector 22 and controller 24 of one of the mobile phones 2,4,6,8 may be designated as the "master" and the detectors 22 and controllers 24 of the other mobile phone designated as the "slaves". The "master" detector 22 and controller 24 may effect adjustment of the projection systems 102, 104, 106, 108 in the other mobile phones 2,4,6,8.

The brightness of each of the images 12,14,16,18 visible on the display surface 10 is limited by the maximum brightness of the light which can be provided by the light source 120 in each projection system 102,104,106,108. Overlapping the images 12,14,16,18 projected by each projection system 102, 104,106,108 on the display surface 10 will display a single, brighter image, on the display surface 10.

To achieve overlapping of the images 12,14,16,18 on the display surface 10 a user may simply orientate the mobile phones 2,4,6,8 so that their respective projection systems 102,104,106,108 each project to the same position on the display surface 10. Accordingly, if the projection system 102, 104,106,108 of each mobile phone 2,4,6,8 projects the same image 12,14,16,18 the images will overlap so that a single image is visible on the screen. As the single image is formed by the light projected by all four of the projection systems 102,104,106,108 the displayed single image will appear brighter on the display surface 10.

Alternatively, to achieve overlapping of the images 12,14, 16,18, the detector 22 in projection system 102 detects the position of each of the images 12,14,16,18 on the display surface 10. The detector 22 also detects the brightness of each image and the dimensions of each image 12,14,16,18. The detector 22 passes image position information, image size information and image brightness information, for each of the images 12,14,16,18, to the controller 24.

Based on the image position information provided by the detector 22, the controller 24 calculates an optimum position on the display surface 10 at which the images 12,14,16,18, should be overlapped. The optimum position is the position on the display surface 10 which is closest to each of the projected images (i.e., the average position); therefore, overlapping the images 12,14,16,18 at the optimum position which will ensure minimal overall adjustment of the projection systems 102,104,106,108 is required in order to achieve the desired overlapping of images 12,14,16,18 on the display surface 10. In the present example the controller 24 has calculated that the optimum position on the display surface 10 for overlapping of images 12,14,16,18 is position 30. Accordingly, the controller 24 will adjust each of the projection systems 102,104,106,108 such that they each project their respective images 12,14,16,18 to position 30 on the display surface 10.

To adjust the projection system 102 such that it projects its image 12 to position 30 on the display surface, the controller 24 adjusts the actuation signal, which is applied to piezoelectric actuators (not shown) that oscillate the MEMS micromirror 132 within the projection system 102 about the two oscillation axes 134,136, to include a DC off-set. It will be understood that the actuators may take any suitable form and are not limited to piezoelectric actuators; for example the actuators may be magnetic, electrostatic, thermal, or electromagnetic. The application of a DC off-set to the actuation signal causes off-setting of the position of the MEMS micro mirror 132 so that the image 12 is projected to position 30 on the display surface 10. Comparing the current position of the image 12 with the optimum position 30, the controller 24 calculates the amplitude of DC off-set to be applied to the actuation signal.

To adjust the other projection systems 104,106,108 such that they each project their respective images 14,16,18 to position 30 on the display surface 10, the controller 24 sends an adjustment command, via the wireless communication means, to each of the other projection systems 104,106,108. The adjustment commands are received by the receivers 40, 60, 80 of each projection system 104,106,108. Each adjustment command, when executed within the projection system 104,106,108, will effect adjustment of the actuation signal, which is applied to piezoelectric actuators (not shown) to oscillate the respective MEMS micro-mirrors 132 within each projection system 104,106,108 about the two oscillation axes 134,136, to include a DC off-set. In each projection system 104,106,108 the application of a DC off-set to the actuation signal causes off-setting of the position of the MEMS micro mirror 132 within that projection system 104, 106,108 so that the projection system 104,106,108 projects its image 14,16,18 to position 30 on the display surface 10. For each projection system 104,106,108 the required amplitude of DC off-set to be applied to the actuation signal is calculated by the controller 24 by comparing the current position of the image 14,16,18 projected by that projection system 104,106, 108, with the optimum position 30. As each mobile phone 2,4,6,8 has a different orientation, the MEMS micro mirror 132 of each projection system 104,106,108 will require a different adjustment, consequently the amplitude of DC off-set to be applied to the actuation signal in each projection system 104,106,108 will be different for each projection system 104,106,108.

Once the required DC off-set has been applied to the actuation signal in each projection system 102,104,106,108, the projection system 102,104,106,108 of each mobile phone 2,4,6,8 will project their respective images 12,14,16,18 to the same position on the display surface (i.e., to optimum position 30) so that the images 12,14,16,18 overlap at optimum position 30.

To display a single image of increased brightness the overlapping images 12,14,16,18 should each be the same size. To adjust the size of the image 12,14,16,18 projected by a projection system 102,104,106,108, the controller 24 adjusts the amplitude of the actuation signal which is applied to piezoelectric actuators to oscillate the MEMS micro-mirrors 132 within each projection system 102,104,106,108. Based on the image size information provided by the detector 22 the controller 24 calculates an optimum image size. The optimum image size will be the average size of each of the four projected images 12,14,16,18, thus will be the image size which can most efficiently be achieved as it will required the least overall adjustment of the projection systems 102,104,106, 108. For each projection system 102,104,106,108, using the image size information provided by the detector 22, the controller 24 determines whether that projection system 102,104, 106,108 should be adjusted to increase the size of the image 12,14,16,18, or adjusted to decrease the size of the image 12,14,16,18, to achieve the optimum image size.

To increase the size of an image 12,14,16,18 the controller 24 increases the amplitude of the actuation signal, which is applied to piezoelectric actuators to oscillate the MEMS micro-mirror 132 within that projection system 102,104,106, 108. Increasing the amplitude of the actuation signal increases the amplitude of oscillations of the MEMS micro-mirror 132 about at least one of its oscillation axes 134,136 (e.g., the oscillation axis about which the MEMS micro mirror 132 oscillates to scan light along the horizontal). Increasing the amplitude of the oscillations of the MEMS micro-mirror 132 about at least one of its oscillation axes 134,136 will ensure light is scanned across a larger area of the display surface 10, thus the image 12,14,16,18 will be projected over a larger area of the display surface 10 to provide a larger image. Conversely, to decrease the size of an image 12,14,16, 18 the controller 24 decreases the amplitude of the actuation signal which is applied to piezoelectric actuators to oscillate the MEMS micro-mirror 132 within that projection system 102,104,106, 108. Decreasing the amplitude of the actuation signal decreases the amplitude of oscillation of the MEMS micro-mirror 132 about at least one of its oscillation axes 134,136 (e.g., the oscillation axis about which the MEMS micro mirror 132 oscillates to scan light along the horizontal). Decreasing the amplitude of oscillations of the MEMS micro-mirror 132 about at least one of its oscillation axes 134,136 will ensure light is scanned across a smaller area of the display surface 10, thus the image 12,14,16,18 will be projected over a smaller area of the display surface 10 to provide a smaller image.

Based on the size information for the images 12,14,16,18 provided by the detector 22, the controller 24 calculates the size adjustment required for each image 12,14,16,18 so that each image has a size equal to the optimum image size. In the present example the optimum image size is illustrated as a dashed line at position 30 of the display surface 10. To achieve the optimum image size the image 12 projected by projection system 102 should be reduced in size and images 14,16, and 18 projected by projection systems 104,106,108 should each be increased in size. Based on the size information for the images 12,14,16,18 provided by the detector 22, the controller 24 calculates the reduction in image size required for image 12 and equates this reduction in image size to a required reduction in amplitude for the actuation signal used to oscillate the MEMS micro-mirror 132. The controller 24 subsequently reduces the amplitude of the actuation signal in projection system 102 accordingly. Based on the size information provided by the detector 22, the controller 24 also calculates the increase in image size required for each of images 14,16,18 and equates each increase in image size to a required increase in amplitude for the actuation signals used in each projection system 104,106,108 to oscillate the MEMS micro-mirror 132. The controller 24 subsequently sends adjustment commands to each of projection systems 104,106, 108 which affect the required increase in the amplitudes of the actuation signals when executed within the respective projection system 104,106,108. Once the amplitudes of the MEMS mirror actuation signals in each projection system 102,104, 106,108 have been adjusted by the controller 24, the same sized image 12,14,16,18 will be projected by each of the projection systems 102,104,106,108 at optimum position 30 on the display surface 10.

Additionally, or alternatively, the size of the image 12,14, 16,18 projected by a projection system 102,104,106,108 may be adjusted by changing the modulation of the light source 120 in the projection system 102,104,106,108. The controller 24 may increase the rate at which light pulses are generated by the light source 120 within a projection system 102,104,106, 108 to decrease the size of the image 12,14,16,18 projected by that projection system 102,104,106,108. An increase in the rate at which light pulses 4 are generated causes successive light pulses 4 to reach the MEMS micro mirror 132 of a projection system 102,104,106,108 at a faster rate which in turn means that successive light pulses 4 are projected to the display surface 10 at a faster rate. Since each light pulse 4 corresponds to a pixel of the projected image 12,14,16,18, the pixels will be closer together on the display surface 10 as the time between consecutive light pulses 4 is less and the speed of oscillation of the MEMS micro mirror has remained unchanged. Accordingly, a smaller image 12,14,16,18 will be visible on the display surface 10. Furthermore, given that the light pulses 4 are generated at a higher rate the light pulses 4 corresponding to each a row of pixels are projected onto the display surface 10 before the MEMS micro mirror 132 has completed an oscillation. Accordingly, the row of pixels will be displayed over a smaller span of the display surface 10. The same will be true for each row of pixels. Accordingly, the image 12,14,16,18 will be displayed over a smaller area of the display surface 10.

Optionally, the speed of oscillation of the MEMS micro mirror 132 within each projection system 102,104,106,108 may also be adjusted to compensate for the effects of laser modulation. For example, the speed of oscillation of the MEMS micro mirror 132 may be increased to ensure that the distance between successive pixels is not reduced by an increase in the rate at which the light source 120 generates light pulses 4.

It will be understood that each projection system 102,104, 106,108 could be simultaneously adjusted by the controller 24 for image size and image position.

Figure 4:
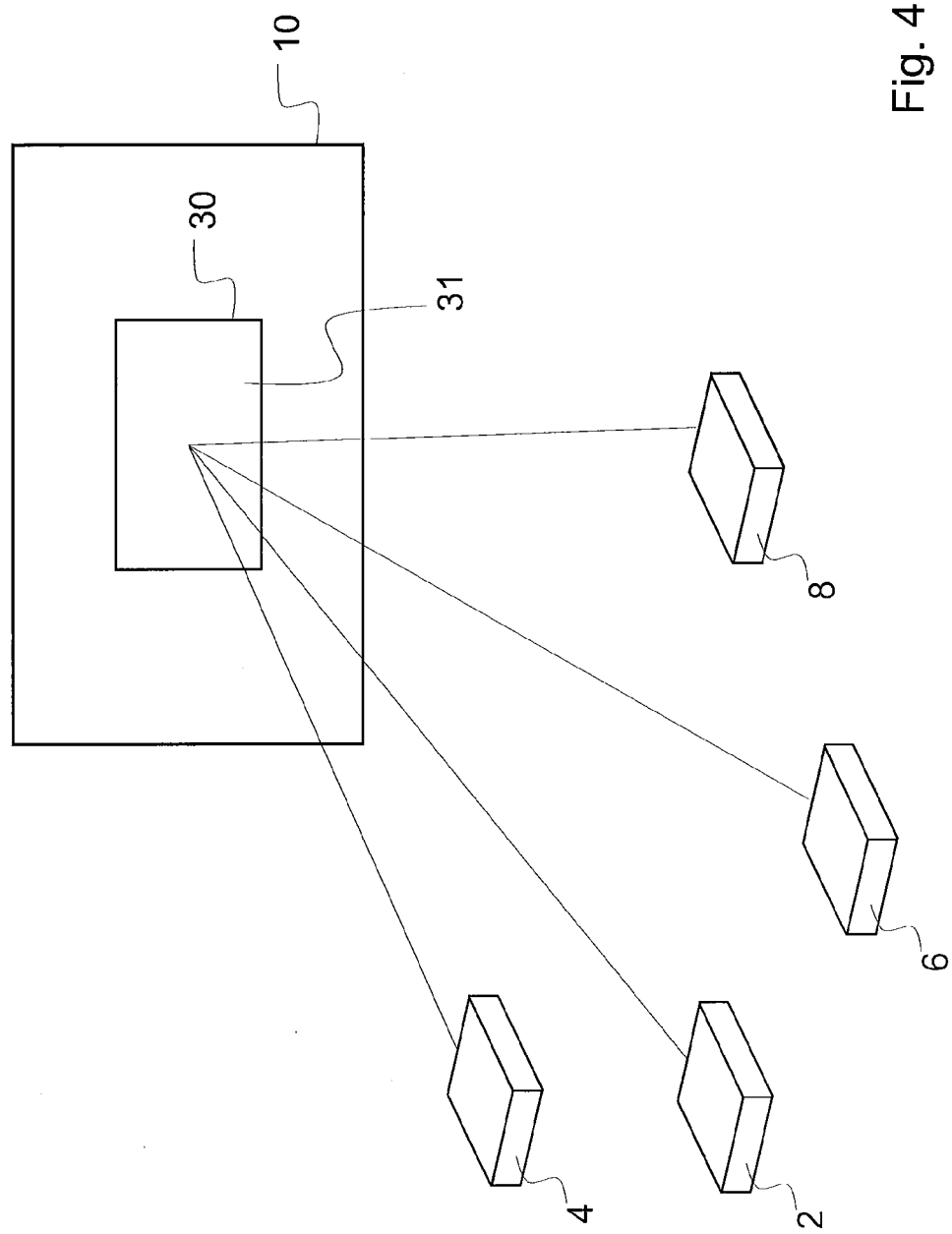
FIG. 4 provides a perspective view of the four mobile phones shown in FIG. 1 after a method according to one embodiment of the present invention has been implemented.

FIG. 4 provides a perspective view of the mobile phones after each projection system 102, 104,106,108 of each mobile phone 2,4,6,8 has been adjusted to project an image of the same size (optimum size) to the optimum position 30. Each of the projection systems 102, 104, 106, 108 projects the same image onto the display surface 10. Accordingly, as shown in FIG. 4, the image projected by each projection system overlaps on the display surface to display a single image 31 at position 30. The single image 31 has an overall brightness which is greater than the brightness of an image which could be projected by any of the projection systems 102, 104,106, 108 alone. The overlapping of the images on the display surface 10 allows the light projected by each projection system 102, 104, 106, 108 to be combined on the display surface 10, to form a brighter image 31.

Figure 5:
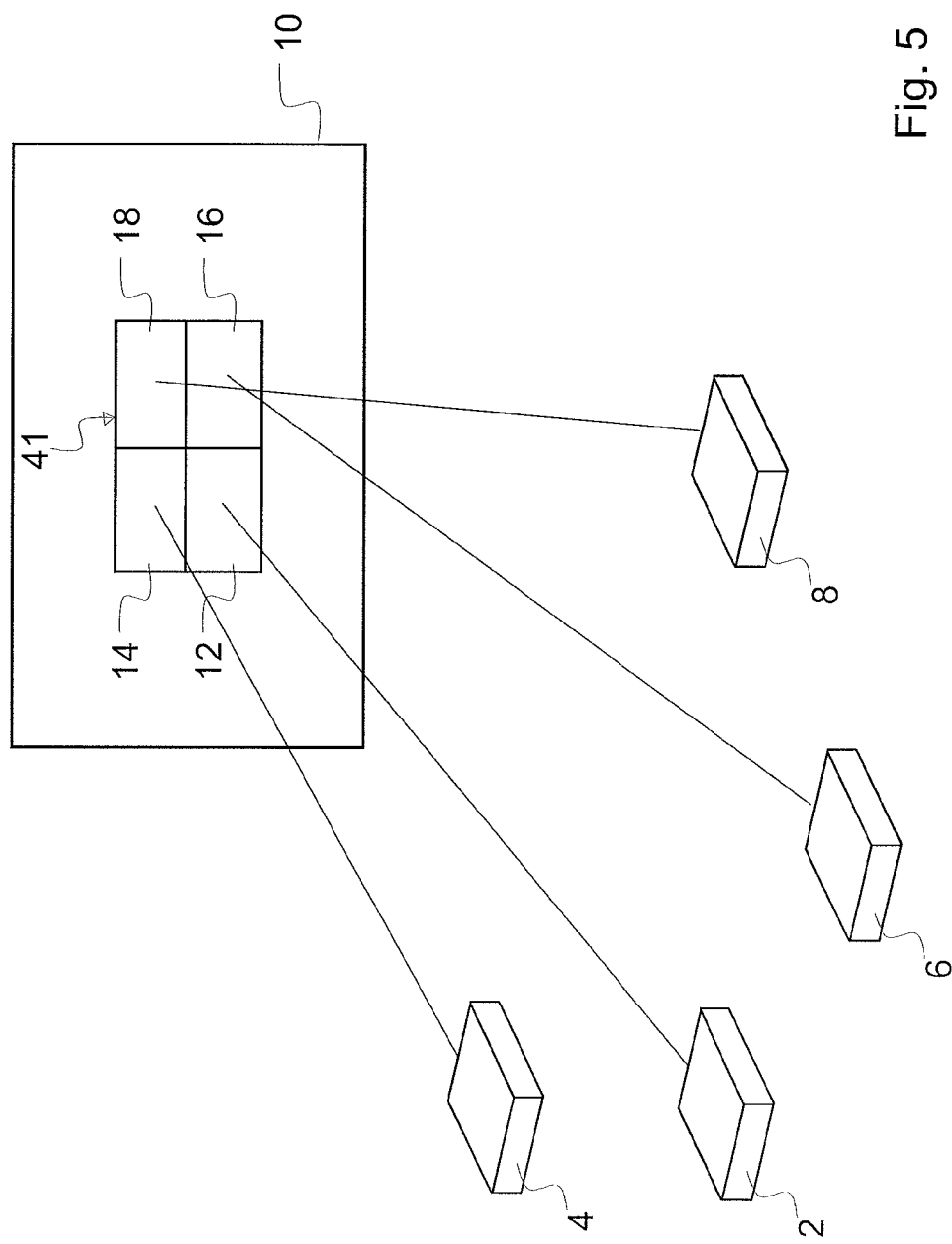
FIG. 5 provides a perspective view of the four mobile phones shown in FIG. 1 after a method according to further embodiment of the present invention has been implemented.

Instead of adjusting each projection system 102, 104,106, 108 so that the projected images overlap on the display surface 10, the controller 24 may alternatively adjust each projection systems 102,104,106,108 so that the projected images are in alignment on the display surface 10. As illustrated in FIG. 5, the images 12,14,16,18 projected by each projection system 102, 104,106,108 align on the display surface 10 to form a single, larger complete image 41. The images 12,14, 16,18 projected by each projection system 102, 104,106,108 each form a different part of the complete image 41; image 12 projected by projection system 102 forms the bottom left quarter of the complete image 41, image 14 projected by projection system 104 forms the top left quarter of the complete image 41, image 16 projected by projection system 106 forms the bottom right quarter of the complete image 41, image 18 projected by projection system 108 forms the top right quarter of the complete image 41. The images 12,14,16, 18 combine, similar to pieces of a jig-saw, to display a single complete image 41 on the display surface 10. The resulting image displayed on the display surface 10 is larger than an image (of the same brightness) which could be projected by any of the projection systems 102, 104,106,108 alone.

The controller 24 adjusts each projection system 102, 104, 106,108 so that the images 12,14,16,18 projected by each projection system 102, 104,106,108 precisely align on the display surface 10. Precise alignment of the projected images 12,14,16,18 ensures that the complete image 41, is without gaps, spaces or borders (For example, there exists no gap between image 12 and any of the other images 14,16,18). Using the position information provided by the detector 22, the controller 24 adjusts each projection system 102,104,106, 108 so that each projection system 102,104,106,108 projects an image to a desired position on the display surface 10. The controller 24 adjusts each projection system 102,104, 106, 108 in a similar manner as previously described (i.e., by adjusting actuation signal actuation signals used to oscillate the MEMS micro-mirror 132, to include a DC off-set), to achieve alignment of the projected images 12,14,16,18.

As well as adjustment of the projection systems for image size and position, the controller 24 may further adjust each projection system 102,104,106,108 such that the brightness of each image projected by each projection system 102,104, 106,108 is the same. This is particularly useful when the images projected by each projection system 102,104,106,108 are to be aligned rather than overlapped, as it allows for the complete image 41 visible on the projection display surface 10 to have a uniform brightness.

Based on the brightness of each image 12,14,16,18 detected by the detector 22, the controller 24 can determine the adjustment required for each projection system 102,104, 106,108 such that each projection system 102,104,106,108 projects an image at a predetermined brightness. The predetermined brightness may be the average of the brightness of all the projected images 12,14,16,18 detected by the detector 22. The controller 24 adjusts the light source 120 within the projection system 102 to increase or decrease the brightness of the projected light to the predetermined brightness. For projection systems 104,106,108 the controller 24 sends adjustment commands to each of the projection systems 104, 106,108 which when executed adjusts the light sources 120 within each of the projection systems 104,106,108 to increase or decrease the brightness of the projected light to the predetermined brightness.

Figure 6:
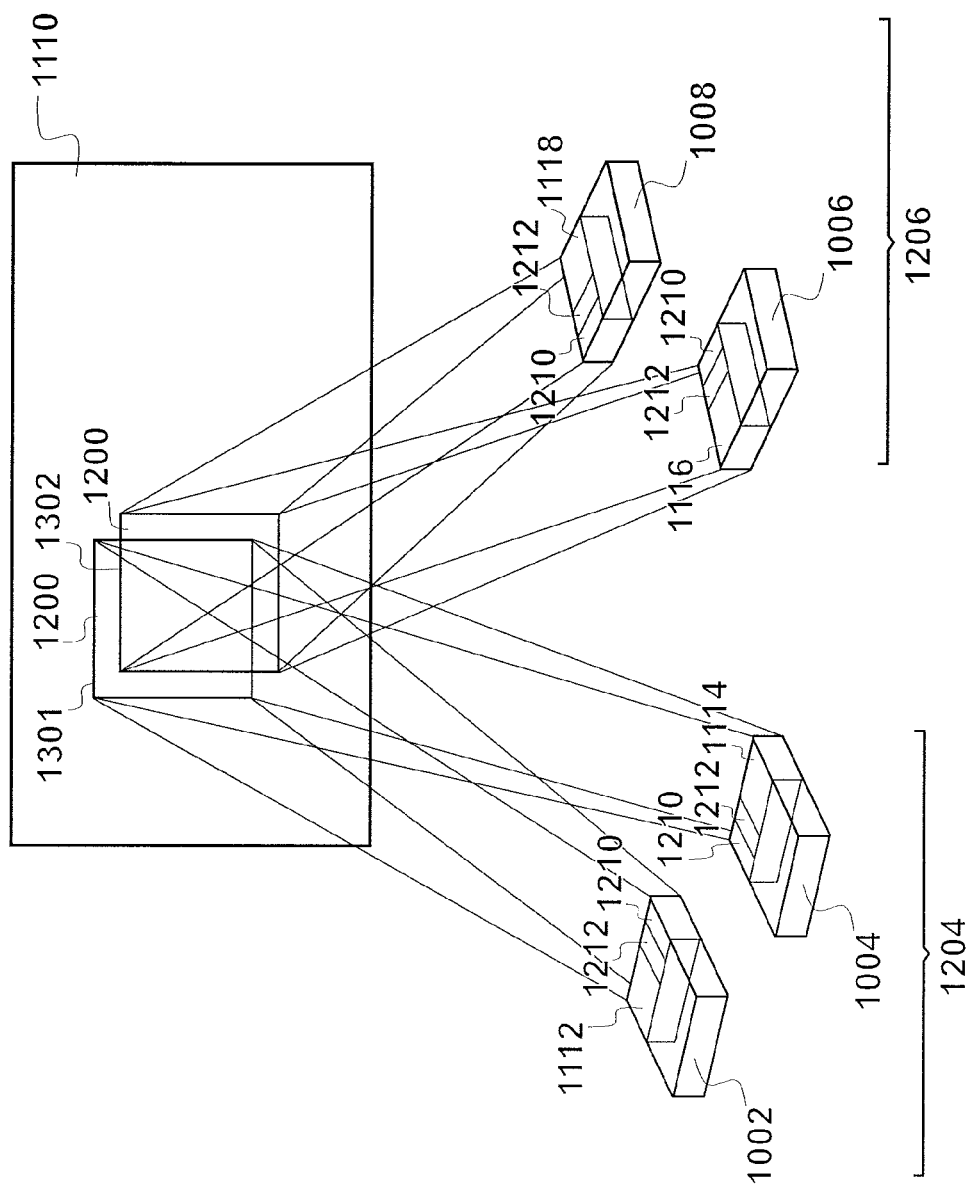
FIG. 6 provides a perspective view of four mobile phones, each of which comprises a projection system according to an aspect of the present invention, wherein the projection system of each mobile phone is arranged to project an 3-D viewable image onto a display surface.

FIG. 6 provides a perspective view of four mobile phones, 1002, 1004, 1006, 1008, each of which comprises a projection system 1112, 1114, 1116, 1118, which projects an image onto a display surface 1110. The four mobile phones 1002, 1004,1006,1008 may comprise some or all of the features of the mobile phones 2,4,6,8 shown in FIG. 1. The projection systems 1112, 1114, 1116, 1118, may comprise some or all of the features of the projection system 102,104,106, 108 in mobile phones, 2,4,6,8 shown in FIG. 1.

The four mobile phones 1002, 1004, 1006, 1008, and thus the projection systems 1112, 1114, 1116, 1118, are arranged into two groups 1204,1206; the projection systems 1112, 1114 in mobile phones 1002,1004 define a first group 1204 and the projection systems 1116, 1118 in mobile phones 1006,1008 define a second group 1206.

Each of the projection systems 1112, 1114, 1116, 1118, of each mobile phone 1002,1004, 1006,1008 is arranged to project an image 1200 onto a display surface 1110; each of the projection systems 1112, 1114, 1116, 1118, project an image 1200 onto the display surface 1110, however projection systems 1112, 1114 (i.e., the first group) project their images to a first position 1301 on the display surface 1110 and projection systems 1116, 1118 (i.e., the second group) project their images to a second position 1302 on the display surface 1110. Each of the images projected by projection systems 1112, 1114 (i.e., the first group) overlay each other at the first position 1301 on the display surface 1110; while each of the images projected by projection systems 1116, 1118 (i.e., the second group) overlay each other at the second position 1302 on the display surface 1110. The images 1200 projected by each of the projection systems 1112, 1114, 1116, 1118, have the same pictographic information.

The projection systems 1112, 1114, 1116, 1118, each comprise a detector 1210. The detectors 1210 in projection systems 1112, 1114, are each operable to detect the position on the display surface 1110 at which the projection systems 1116, 1118, project their images 1200. The detectors 1210 in projection systems 1116, 1118, are each operable to detect the position on the display surface 1110 at which the projection systems 1112, 1114 project their images 1200.

Each projection system 1112, 1114, 1116, 1118, comprises a controller 1212. The controllers 1212 in projection systems 1112, 1114, are operable to adjust respective projection systems 1112, 1114, such that these projection systems 1112, 1114, project their images 1200 to a first position 1301 on the display surface 1110. The controllers 1212 in projection systems 1116, 1118, are operable to adjust respective projection systems 1112, 1114, such that these projection systems 1112, 1114, project their images 1200 to a second position 1302 on the display surface 1110. The first position 1301 is determined on the basis of the position on the display surface 1110 at which the projection systems 1116, 1118, project their images, as detected by the detectors 1210 in projection systems 1112, 1114. The second position 1302 is determined on the basis of the position on the display surface 1110 at which the projection systems 1112, 1114, project their images 1200, as detected by the detectors 1210 in projection systems 1116, 1118. The first position 1302 and second position 1302 may be off-set from one another such that the alternative projection of an image 1200 by the projection systems 1116, 1118, and projection systems 1112, 1114, at the first and second positions 1301,1302 respectively, provides a 3-D viewable image on the display surface 1110. In this particular, example first position 1301 and second position 1302 are off-set from one another by a distance between 5 cm-9 cm, which is the average distance between a viewer's right and left eyes.

The first group 1204 of projection systems 1112, 1114, are configured to project the same image 1200 simultaneously to the first position, while the second group 1206 of projection systems 1116, 1118 are configured to project the same image 1200 simultaneously to the second position on the display surface 1110. The first group 1204 of projection systems 1112, 1114, and second group 1206 of projection systems 1116, 1118, are configured to alternately project their respective images 1200. The alternate projection of images 1200 which have the same pictographic information, to first and second positions 1301,1302 on the display surface 1110 which are off-setting of the by a distance between 0.1 cm-9 cm, provides a 3-D viewable image on the display screen 1110.

It will be understood that the invention is not limited to requiring each of the projection systems 1112, 1114, 1116, 1118, to have a detector and controller; it will be understood that the invention will still work provided that at least one of the projection systems 1112, 1114, 1116, 1118, have a detector and controller.

The projection systems 1112, 1114, may further comprise a means (not shown) to dynamically adjust the position to which the first group 1204 of projection systems project an image and the projection systems 1116, 1118 may further comprise a means to dynamically adjust the position to which the second group 1206 of projection systems project an image, so that the off-set between the first and second positions can be dynamically adjusted. The projection system may further comprise a means (not shown) for detecting the position of a viewer relative to the display screen 1110. The projection system may comprise a means for determining an optimum position to which the first group 1204 of projection systems should project an image and an optimum position to which the second group 1206 of projection systems should project an image, based on the position of the viewer detected. Knowing the position of the viewer, the position to which the first group 1204 of projection systems projects an image 1200 and the position to which the second group 1206 of projection systems projects an image 1200, can be dynamically adjusted so that a 3-D image will always be visible to a viewer regardless of the position of the viewer; and even as the viewer changes their position.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A method for projecting a 3-D viewable image onto a display surface, comprising the steps of:
    a. providing two or more projection systems;
    b. arranging the two or more projection systems into a first group and second group, wherein the first group and second group each comprise one or more projection systems;
    c. arranging the first and second group of projection systems such that each group of projection systems can project an image on a display surface, wherein the first group of projection systems is arranged such that the first group of projection systems can project images to a first position on the display surface so said images projected by the first group of projection systems overlap and the second group of projection systems arranged such that the second group of projection systems can project images to a second position on the display surface so that said images projected by said second group of projection systems overlap, wherein the first and second positions are off-set from one another, wherein the step of arranging the first and second group of projection systems such that they project to first and second positions comprises configuring a MEMS mirror in each of the projection systems such that the MEMS mirrors of the first and second group of projection systems deflect light to the first and second position respectively;
    d. configuring the first and second group of projection systems such that the first and second group of projection systems alternately project onto the display surface so that a 3-D image is visible on the display screen; wherein the method further comprises the step of,
    e. configuring the first group of projection systems such that they project images which comprise two or more different exposures, and configuring the second group of projection systems such that they project images which comprise two or more different exposures, so that brightness of the 3-D image is improved.

2. The method according to claim 1 wherein the step of arranging the first and second group of projection systems comprises arranging the first and second group of projection systems such that first position to which the first group of projection systems can project and the second position to which the second group of projection systems can project, are off-set from one another by an amount required to provide a 3-D viewable image on the display surface.

3. The method according to claim 2 wherein the first position and second position are off-set from one another by a distance between 0 cm-11 cm.

4. The method according to claim 3 wherein the first position and second position are off-set from one another by a distance between 0.1 cm-3 cm.

5. The method according to claim 1 wherein the first group of projection systems project onto the display surface at a rate of 1 Hz to 400 Hz or 1 to 400 times per second, and the second group of projection systems project onto the display surface at a rate of 1 Hz to 400 Hz or 1 to 400 times per second.

6. The method according to claim 1 further comprising the step of dynamically adjusting the position to which the first group of projection systems project an image and the position to which the second group of projection systems project an image, so as to dynamically adjust the off-set between the first and second positions.

7. The method according to claim 1 further comprising the step of detecting the position of a viewer relative to a display surface.

8. The method according to claim 1 further comprising the step of dynamically adjusting the position to which the first group of projection systems project an image and the position to which the second group of projection systems project an image, based on the position of a viewer relative to a display surface, so as to dynamically adjust the off-set between the first and second positions so that a 3-D image is viewable to a viewer from their position.

9. The method according to claim 1 further comprising the step of detecting irregularities on the display surface and adjusting the both the first and second group of projection systems to compensate for the detected irregularities, so that an undistorted 3-D image is viewable on the display surface.

10. A projection system useable to implement a method according to claim 1, the projection system being configured to project images with two or more different exposures which can cooperate with other images projected with two or more different exposures, by one or more other projection systems, to provide a 3-D viewable image with improved brightness, on a display surface, the projection system comprising:
   a detector operable to detect a first position, wherein the first position is the position on a display surface at which images projected with two or more different exposures by a second projection system, are located; and
   a controller operable to adjust the projection system, by configuring a MEMS mirror in said projection system so that it can deflect light to a second position on the display screen, such that the projection system projects images with two or more different exposures to the second position on the display surface, wherein the first position and second position are off-set from one another such that the alternative projection of the first image by the second projection system and the second image by the first projection system, provides a 3-D viewable image, which has an improved brightness, on the display surface.

11. The projection system according to claim 10 wherein the detector is operable to detect a first position and second position on the display surface, wherein the first position is a position on a display surface at which a first image is projected by a group of projection systems and the second position is a position on the display surface the projection system is to project a second image, and wherein the controller is operable to adjust the projection system, such that it projects a second image to the second position on the display surface, and wherein the first position and second position are off-set from one another such that the alternative projection of the first image by the group of projection systems and the second image by the projection system, provides a 3-D viewable image on the display surface.

12. The projection system according to claim 10 further comprising a means to dynamically adjust the position to which the projection system projects an image and the position to which the second projection system projects an image, so as to dynamically adjust the off-set between the first and second positions.

13. The projection system according to claim 10 further comprising a means for detecting the position of a viewer relative to a display surface.

14. The projection system according to claim 10 further comprising a means for determining an optimum position to which the projection system should project an image and an optimum position to which the second projection system should project an image, based on the position of a viewer relative to a display surface, so as to dynamically adjust the off-set between the first and second positions so that a 3-D image is viewable to a viewer from their position.

15. The projection system according to claim 10 further comprising a means for refreshing the second image projected by the projection system and the image projected by the second projection system.

* * * * *